US008214286B1

(12) United States Patent
Galit et al.

(10) Patent No.: US 8,214,286 B1
(45) Date of Patent: Jul. 3, 2012

(54) COMPUTERIZED EXTENSION OF CREDIT TO EXISTING DEMAND DEPOSIT ACCOUNTS, PREPAID CARDS AND LINES OF CREDIT BASED ON EXPECTED TAX REFUND PROCEEDS, ASSOCIATED SYSTEMS AND COMPUTER PROGRAM PRODUCTS

(75) Inventors: Scott H. Galit, New York, NY (US); Trent Sorbe, Brookings, SD (US)

(73) Assignee: Metabank, Sioux Falls, SD (US)

( * ) Notice: Subject to any disclaimer, the term of this patent is extended or adjusted under 35 U.S.C. 154(b) by 0 days.

(21) Appl. No.: 13/329,748

(22) Filed: Dec. 19, 2011

Related U.S. Application Data

(63) Continuation of application No. 12/407,320, filed on Mar. 19, 2009, now Pat. No. 8,090,649.

(51) Int. Cl.
*G06Q 40/00* (2006.01)
(52) U.S. Cl. .......................................... 705/38; 705/31
(58) Field of Classification Search ............... 705/31, 705/38
See application file for complete search history.

(56) References Cited

U.S. PATENT DOCUMENTS

| | | |
|---|---|---|
| 3,752,904 A | 8/1973 | Waterbury |
| 4,247,759 A | 1/1981 | Yuris et al. |
| 4,334,307 A | 6/1982 | Bourgeois et al. |
| 4,439,636 A | 3/1984 | Newkirk et al. |
| 4,449,040 A | 5/1984 | Matsuoka et al. |
| 4,528,643 A | 7/1985 | Freeny, Jr. |
| 4,532,416 A | 7/1985 | Berstein |
| 4,577,061 A | 3/1986 | Katzeff et al. |
| 4,625,276 A | 11/1986 | Benton et al. |
| 4,677,565 A | 6/1987 | Ogaki et al. |
| 4,678,895 A | 7/1987 | Tateisi et al. |
| 4,706,275 A | 11/1987 | Kamal |
| 4,722,054 A | 1/1988 | Yorozu et al. |
| 4,727,243 A | 2/1988 | Saver |
| 4,750,201 A | 6/1988 | Hodgson et al. |
| 4,797,540 A | 1/1989 | Kimizu |

(Continued)

FOREIGN PATENT DOCUMENTS

EP 0397512 11/1990

(Continued)

OTHER PUBLICATIONS

Office Action in co-pending U.S. Appl. No. 12/607,780 dated Mar. 19, 2012.

(Continued)

*Primary Examiner* — Samica L Norman
(74) *Attorney, Agent, or Firm* — Bracewell & Giuliani LLP

(57) ABSTRACT

Systems, computer program products, and computer-implemented methods apply or otherwise make available new credit or additional credit to demand deposit accounts, prepaid cards, and existing lines of credit of a customer based on expected tax refund amounts. A computerized estimate of the tax refund available from a tax return of the customer is formed. A portion of the computerized estimate of the tax refund which can be made available as the line of credit is then determined. The existing line of credit is then adjusted based on the expected refund determined to be available, which will serve as an additional source of repayment for the line of credit. One or more of several adjustments may then be made to an existing line of credit. The invention may be implemented as a computerized process, a computer system or a computer program product.

9 Claims, 4 Drawing Sheets

U.S. PATENT DOCUMENTS

| | | | |
|---|---|---|---|
| 4,827,113 A | 5/1989 | Rikuna | |
| 4,868,900 A | 9/1989 | McGuire | |
| 4,877,947 A | 10/1989 | Mori | |
| 4,879,744 A | 11/1989 | Tasaki et al. | |
| 4,884,212 A | 11/1989 | Stutsman | |
| 4,951,308 A | 8/1990 | Bishop et al. | |
| 4,968,873 A | 11/1990 | Dethloff et al. | |
| 5,012,077 A | 4/1991 | Takano | |
| 5,048,085 A | 9/1991 | Abraham et al. | |
| 5,050,207 A | 9/1991 | Hitchcock | |
| 5,068,891 A | 11/1991 | Marshall | |
| 5,101,098 A | 3/1992 | Naito | |
| 5,138,650 A | 8/1992 | Stahl et al. | |
| 5,146,067 A | 9/1992 | Sloan et al. | |
| 5,148,481 A | 9/1992 | Abraham et al. | |
| 5,155,342 A | 10/1992 | Urano | |
| 5,163,086 A | 11/1992 | Ahearn et al. | |
| 5,192,947 A | 3/1993 | Neustein | |
| 5,220,593 A | 6/1993 | Zicker et al. | |
| 5,221,838 A | 6/1993 | Gutman et al. | |
| 5,225,666 A | 7/1993 | Amarena et al. | |
| 5,264,689 A | 11/1993 | Maes et al. | |
| 5,265,155 A | 11/1993 | Castro | |
| 5,266,782 A | 11/1993 | Alanara et al. | |
| 5,272,320 A | 12/1993 | Hakamada | |
| 5,278,752 A | 1/1994 | Narita et al. | |
| 5,285,382 A | 2/1994 | Muehlberger et al. | |
| 5,327,482 A | 7/1994 | Yamamoto | |
| 5,334,821 A | 8/1994 | Campo et al. | |
| 5,340,969 A | 8/1994 | Cox | |
| 5,352,876 A | 10/1994 | Watanabe et al. | |
| 5,359,182 A | 10/1994 | Schiling | |
| 5,409,092 A | 4/1995 | Itako et al. | |
| 5,416,306 A | 5/1995 | Imahata | |
| 5,438,186 A | 8/1995 | Nair et al. | |
| 5,442,567 A | 8/1995 | Small | |
| 5,448,044 A | 9/1995 | Price et al. | |
| 5,477,038 A | 12/1995 | Levine et al. | |
| 5,504,808 A | 4/1996 | Hamrick, Jr. | |
| 5,511,114 A | 4/1996 | Stimson et al. | |
| 5,513,117 A | 4/1996 | Small | |
| 5,550,358 A | 8/1996 | Tait et al. | |
| 5,577,109 A | 11/1996 | Stimson et al. | |
| 5,577,121 A | 11/1996 | Davis et al. | |
| 5,661,254 A | 8/1997 | Steuer et al. | |
| 5,696,908 A | 12/1997 | Muehlberger et al. | |
| 5,699,528 A | 12/1997 | Hogan | |
| 5,732,136 A | 3/1998 | Murphree et al. | |
| 5,814,798 A | 9/1998 | Zancho | |
| 5,841,365 A | 11/1998 | Rimkus | |
| 5,859,419 A | 1/1999 | Wynn | |
| 5,875,437 A | 2/1999 | Atkins | |
| 5,878,141 A | 3/1999 | Daly et al. | |
| 5,893,907 A | 4/1999 | Ukuda | |
| 5,897,620 A | 4/1999 | Walker et al. | |
| 5,920,848 A | 7/1999 | Schutzer et al. | |
| 5,933,812 A | 8/1999 | Meyer et al. | |
| 5,963,921 A * | 10/1999 | Longfield | 705/31 |
| 6,000,608 A | 12/1999 | Dorf | |
| 6,012,635 A | 1/2000 | Shimada et al. | |
| 6,021,397 A | 2/2000 | Jones et al. | |
| 6,032,859 A | 3/2000 | Muehlberger et al. | |
| 6,041,308 A | 3/2000 | Walker et al. | |
| 6,065,679 A | 5/2000 | Levie et al. | |
| 6,112,191 A | 8/2000 | Burke | |
| 6,144,948 A | 11/2000 | Walker et al. | |
| 6,154,738 A | 11/2000 | Call | |
| 6,189,787 B1 | 2/2001 | Dorf | |
| 6,208,978 B1 | 3/2001 | Walker et al. | |
| 6,249,773 B1 | 6/2001 | Allard et al. | |
| 6,253,998 B1 | 7/2001 | Ziamo | |
| 6,304,860 B1 | 10/2001 | Martin et al. | |
| 6,467,684 B2 | 10/2002 | Fite et al. | |
| 6,704,714 B1 | 3/2004 | O'Leary et al. | |
| 6,739,506 B1 | 5/2004 | Constantine | |
| 6,865,544 B1 | 3/2005 | Austin | |
| 6,999,943 B1 | 2/2006 | Johnson et al. | |
| 7,010,507 B1 * | 3/2006 | Anderson et al. | 705/31 |
| 7,031,939 B1 | 4/2006 | Gallagher et al. | |
| 7,072,862 B1 | 7/2006 | Wilson | |
| 7,127,452 B1 | 10/2006 | Yashiro | |
| 7,177,829 B1 * | 2/2007 | Wilson et al. | 705/31 |
| 7,206,761 B2 | 4/2007 | Colvin | |
| 7,252,223 B2 | 8/2007 | Schofield | |
| 7,258,273 B2 | 8/2007 | Griffin | |
| 7,370,076 B2 | 5/2008 | Friedman et al. | |
| 7,398,919 B2 | 7/2008 | Cooper | |
| 7,426,492 B1 | 9/2008 | Bishop et al. | |
| 7,451,920 B1 | 11/2008 | Rose | |
| 7,509,286 B1 | 3/2009 | Bent et al. | |
| 7,546,945 B1 | 6/2009 | Bucci et al. | |
| 7,567,936 B1 | 7/2009 | Peckover et al. | |
| 7,606,918 B2 | 10/2009 | Holzman et al. | |
| 7,607,570 B1 | 10/2009 | Constantine | |
| 7,628,319 B2 | 12/2009 | Brown | |
| 7,653,591 B1 | 1/2010 | Dabney | |
| 7,702,583 B1 | 4/2010 | Hamilton et al. | |
| 7,702,587 B2 | 4/2010 | Nguyen et al. | |
| 7,757,944 B2 | 7/2010 | Cline et al. | |
| 7,783,571 B2 | 8/2010 | Fish et al. | |
| 7,792,717 B1 | 9/2010 | Hankins et al. | |
| 7,810,735 B2 | 10/2010 | Madani | |
| 7,813,955 B2 | 10/2010 | Ariff et al. | |
| 7,814,012 B2 | 10/2010 | Johnson | |
| 7,865,434 B2 | 1/2011 | Sheets | |
| 7,899,750 B1 | 3/2011 | Klieman et al. | |
| 7,904,333 B1 | 3/2011 | Perkowski | |
| 7,933,833 B2 | 4/2011 | Hotz et al. | |
| 7,954,704 B1 | 6/2011 | Gephart et al. | |
| 8,024,242 B2 | 9/2011 | Galit | |
| 8,046,256 B2 | 10/2011 | Chien et al. | |
| 8,051,006 B1 | 11/2011 | Rourk | |
| 8,055,557 B2 | 11/2011 | Sorbe et al. | |
| 8,065,187 B2 | 11/2011 | Ahlers et al. | |
| 8,069,085 B2 | 11/2011 | Ahlers et al. | |
| 8,086,494 B2 | 12/2011 | Dooley et al. | |
| 8,090,649 B2 | 1/2012 | Galit et al. | |
| 8,103,549 B1 | 1/2012 | Ahlers et al. | |
| 8,108,272 B2 | 1/2012 | Sorbe et al. | |
| 8,108,279 B2 | 1/2012 | Galit et al. | |
| 8,108,977 B1 | 2/2012 | Miller | |
| 2001/0021925 A1 | 9/2001 | Ukigawa et al. | |
| 2001/0034676 A1 | 10/2001 | Vasic | |
| 2001/0042785 A1 | 11/2001 | Walker et al. | |
| 2002/0002075 A1 | 1/2002 | Rowe | |
| 2002/0032612 A1 | 3/2002 | Williams et al. | |
| 2002/0038285 A1 | 3/2002 | Golden et al. | |
| 2002/0042744 A1 | 4/2002 | Kohl | |
| 2002/0055909 A1 | 5/2002 | Fung et al. | |
| 2002/0077971 A1 | 6/2002 | Allred | |
| 2002/0152161 A1 | 10/2002 | Aoike | |
| 2002/0194122 A1 | 12/2002 | Knox et al. | |
| 2002/0194124 A1 | 12/2002 | Hobbs et al. | |
| 2003/0004997 A1 | 1/2003 | Parker et al. | |
| 2003/0055782 A1 | 3/2003 | Slater | |
| 2003/0061170 A1 | 3/2003 | Uzo | |
| 2003/0074311 A1 | 4/2003 | Saylors et al. | |
| 2003/0097331 A1 | 5/2003 | Cohen | |
| 2003/0135459 A1 | 7/2003 | Abelman et al. | |
| 2003/0144935 A1 | 7/2003 | Sobek | |
| 2003/0158811 A1 | 8/2003 | Sanders et al. | |
| 2003/0167225 A1 * | 9/2003 | Adams | 705/38 |
| 2003/0191702 A1 | 10/2003 | Hurley | |
| 2003/0191714 A1 | 10/2003 | Norris | |
| 2003/0197059 A1 | 10/2003 | Tidball et al. | |
| 2003/0200118 A1 | 10/2003 | Lee et al. | |
| 2003/0208443 A1 | 11/2003 | Mersky | |
| 2003/0217003 A1 | 11/2003 | Weinflash et al. | |
| 2004/0036215 A1 | 2/2004 | Butler | |
| 2004/0047459 A1 | 3/2004 | Diaz | |
| 2004/0098351 A1 | 5/2004 | Duke | |
| 2004/0111370 A1 | 6/2004 | Saylors et al. | |
| 2004/0117250 A1 | 6/2004 | Lubow et al. | |
| 2004/0117302 A1 | 6/2004 | Weichert et al. | |
| 2004/0133515 A1 | 7/2004 | McCoy et al. | |
| 2004/0143527 A1 | 7/2004 | Benkert et al. | |
| 2004/0148252 A1 | 7/2004 | Fleishman | |

| | | |
|---|---|---|
| 2004/0153407 A1 | 8/2004 | Clubb et al. |
| 2004/0199463 A1 | 10/2004 | Deggendorf |
| 2004/0210484 A1 | 10/2004 | Lee |
| 2004/0211830 A1 | 10/2004 | Algiene |
| 2004/0215554 A1 | 10/2004 | Kemper et al. |
| 2004/0225545 A1 | 11/2004 | Turner et al. |
| 2004/0230523 A1 | 11/2004 | Johnson |
| 2004/0235542 A1 | 11/2004 | Stronach et al. |
| 2004/0236646 A1 | 11/2004 | Wu et al. |
| 2005/0004839 A1 | 1/2005 | Bakker et al. |
| 2005/0015332 A1 | 1/2005 | Chen |
| 2005/0021363 A1 | 1/2005 | Stimson et al. |
| 2005/0075939 A1 | 4/2005 | Bao et al. |
| 2005/0082364 A1 | 4/2005 | Alvarez et al. |
| 2005/0108121 A1 | 5/2005 | Gravett et al. |
| 2005/0167481 A1 | 8/2005 | Hansen et al. |
| 2005/0167487 A1 | 8/2005 | Conlon et al. |
| 2005/0173520 A1 | 8/2005 | Jaros et al. |
| 2005/0177489 A1 | 8/2005 | Neff et al. |
| 2005/0203837 A1 | 9/2005 | Leigh et al. |
| 2005/0205663 A1 | 9/2005 | Algiene |
| 2005/0228724 A1 | 10/2005 | Frangiosa |
| 2005/0278188 A1 | 12/2005 | Thomson et al. |
| 2005/0278347 A1 | 12/2005 | Wolf et al. |
| 2005/0283436 A1 | 12/2005 | Greer et al. |
| 2006/0059085 A1 | 3/2006 | Tucker |
| 2006/0085269 A1 | 4/2006 | Guilfoyle |
| 2006/0085334 A1 | 4/2006 | Murphy |
| 2006/0149665 A1 | 7/2006 | Weksler |
| 2006/0149670 A1 | 7/2006 | Nguyen |
| 2006/0161499 A1 | 7/2006 | Rich et al. |
| 2006/0190322 A1 | 8/2006 | Oehlerking et al. |
| 2006/0206402 A1 | 9/2006 | Sullivan |
| 2006/0212392 A1 | 9/2006 | Brown |
| 2006/0212393 A1 | 9/2006 | Brown |
| 2006/0224502 A1 | 10/2006 | McGowan |
| 2006/0249570 A1 | 11/2006 | Seifert |
| 2006/0259957 A1 | 11/2006 | Tam et al. |
| 2006/0282356 A1 | 12/2006 | Andres et al. |
| 2006/0282374 A1 | 12/2006 | Stone |
| 2006/0293966 A1 | 12/2006 | Inouye |
| 2007/0000997 A1 | 1/2007 | Lambert et al. |
| 2007/0011089 A1 | 1/2007 | DeSchryver |
| 2007/0038515 A1 | 2/2007 | Postrel |
| 2007/0038924 A1 | 2/2007 | Beyer et al. |
| 2007/0045401 A1 | 3/2007 | Sturm |
| 2007/0061206 A1 | 3/2007 | LeFebvre |
| 2007/0083462 A1 | 4/2007 | Cubillo et al. |
| 2007/0087819 A1 | 4/2007 | VanLuchene et al. |
| 2007/0090183 A1 | 4/2007 | Hursta et al. |
| 2007/0100745 A1 | 5/2007 | Keiser et al. |
| 2007/0106603 A1 | 5/2007 | Whyte et al. |
| 2007/0136194 A1 | 6/2007 | Sloan |
| 2007/0152038 A1 | 7/2007 | Ciancio et al. |
| 2007/0168265 A1 | 7/2007 | Rosenberger |
| 2007/0174189 A1 | 7/2007 | Bishop et al. |
| 2007/0175984 A1 | 8/2007 | Khandaker et al. |
| 2007/0198352 A1 | 8/2007 | Kannegiesser |
| 2007/0198403 A1 | 8/2007 | Aloni et al. |
| 2007/0233596 A1* | 10/2007 | Ambrose, Jr. .................. 705/38 |
| 2007/0244778 A1 | 10/2007 | Bailard |
| 2007/0250380 A1 | 10/2007 | Mankoff |
| 2007/0260536 A1 | 11/2007 | Stone |
| 2007/0262140 A1 | 11/2007 | Long, Sr. |
| 2007/0265957 A1 | 11/2007 | Advani et al. |
| 2007/0265960 A1 | 11/2007 | Advani et al. |
| 2007/0267479 A1 | 11/2007 | Nix et al. |
| 2007/0271178 A1 | 11/2007 | Davis et al. |
| 2007/0276736 A1 | 11/2007 | Guilfoyle |
| 2007/0282740 A1 | 12/2007 | Wendt |
| 2008/0005001 A1 | 1/2008 | Davis et al. |
| 2008/0040261 A1 | 2/2008 | Nix et al. |
| 2008/0040265 A1 | 2/2008 | Rackley et al. |
| 2008/0052189 A1 | 2/2008 | Walker |
| 2008/0059363 A1 | 3/2008 | Hotz et al. |
| 2008/0065532 A1 | 3/2008 | De la Motte |
| 2008/0091519 A1 | 4/2008 | Foss |
| 2008/0103970 A1 | 5/2008 | Books et al. |
| 2008/0120129 A1 | 5/2008 | Seubert et al. |
| 2008/0140561 A1 | 6/2008 | Neel |
| 2008/0140568 A1 | 6/2008 | Henry |
| 2008/0162271 A1 | 7/2008 | Benjamin |
| 2008/0228643 A1 | 9/2008 | Hall |
| 2008/0235095 A1 | 9/2008 | Oles et al. |
| 2008/0270298 A1 | 10/2008 | McElroy et al. |
| 2008/0281734 A1* | 11/2008 | Longe et al. .................. 705/31 |
| 2008/0294977 A1 | 11/2008 | Friedman et al. |
| 2008/0301162 A1 | 12/2008 | Wall et al. |
| 2009/0048963 A1 | 2/2009 | Bishop et al. |
| 2009/0063297 A1 | 3/2009 | Dooley et al. |
| 2009/0063342 A1 | 3/2009 | Beckers |
| 2009/0157220 A1 | 6/2009 | Walker |
| 2009/0164362 A1 | 6/2009 | Moore |
| 2009/0164363 A1 | 6/2009 | Ahlers |
| 2009/0171775 A1 | 7/2009 | Cashion et al. |
| 2009/0192934 A1 | 7/2009 | Chu et al. |
| 2009/0222367 A1 | 9/2009 | Jenkins et al. |
| 2009/0228307 A1 | 9/2009 | Sorbe |
| 2009/0254431 A1 | 10/2009 | Crowe et al. |
| 2010/0030687 A1 | 2/2010 | Panthaki et al. |
| 2010/0057554 A1 | 3/2010 | Lanford |
| 2010/0057609 A1 | 3/2010 | Sibson |
| 2010/0076875 A1* | 3/2010 | Ernst et al. .................. 705/31 |
| 2010/0106555 A1 | 4/2010 | Mneimneh |
| 2010/0222132 A1 | 9/2010 | Sanford et al. |
| 2010/0280949 A1 | 11/2010 | VanRensburg |
| 2010/0306104 A1 | 12/2010 | Johnson |
| 2010/0312684 A1 | 12/2010 | Kemper et al. |
| 2011/0047039 A1 | 2/2011 | Crames et al. |
| 2011/0106698 A1 | 5/2011 | Isaacson et al. |
| 2011/0270664 A1 | 11/2011 | Jones |

FOREIGN PATENT DOCUMENTS

| | | |
|---|---|---|
| EP | 0619565 | 10/1994 |
| EP | 0348932 | 5/1995 |
| JP | 2-238593 | 9/1990 |
| JP | 2-278495 | 11/1990 |
| JP | 3-100791 | 4/1991 |
| JP | 4-165588 | 6/1992 |
| KR | 2010010217 | 2/2010 |
| WO | 86/02757 | 5/1986 |
| WO | 86/07647 | 12/1986 |
| WO | 88/03297 | 5/1988 |
| WO | 89/08899 | 9/1989 |
| WO | 91/09370 | 6/1991 |
| WO | 93/09515 | 5/1993 |
| WO | 94/10649 | 5/1994 |
| WO | 94/28498 | 12/1994 |
| WO | 95/03570 | 2/1995 |
| WO | 97/46986 | 12/1997 |
| WO | 00/60487 | 10/2000 |
| WO | 2007/133315 | 11/2007 |
| WO | 2008102329 A2 | 8/2008 |
| ZA | 200709282 | 10/2007 |

OTHER PUBLICATIONS

Notice of Allowance in co-pending U.S. Appl. No. 12/562,331 dated Mar. 20, 2012.

Notice of Allowance in co-pending U.S. Appl. No. 12/465,803 dated Mar. 20, 2012.

Final Office Action in co-pending U.S. Appl. No. 12/389,749 dated Mar. 29, 2012.

Final Office Action in co-pending U.S. Appl. No. 12/731,852 dated Apr. 5, 2012.

Final Office Action in co-pending U.S. Appl. No. 12/465,306 dated Apr. 11, 2012.

Downes, How to avoid exchange charges Wasting Money A foreign currency bank account could be the answer, The Daily Telegraph, London (UK), Mar. 10, 2007.

Office Action for co-pending U.S. Appl. No. 13/232,405 dated Feb. 2, 2012.

Office Action for co-pending U.S. Appl. No. 12/877,524 dated Feb. 14, 2012.

Notice of Allowance for co-pending U.S. Appl. No. 12/417,182 dated Feb. 14, 2012.

Final Office Action for co-pending U.S. Appl. No. 12/338,497 dated Mar. 1, 2012.
Final Office Action for co-pending U.S. Appl. No. 12/465,277 dated Feb. 28, 2012.
Congressional Budget Office, "Emerging Electronic Methods for Making Payments" (Jun. 1996), CBO.
Coady et al., "Targeted anti-poverty intervention: A selected annotated bibliography" (Apr. 2002), World Bank.
Notice of Allowance from co-pending U.S. Appl. No. 12/609,896 dated Jan. 3, 2012.
Notice of Allowance from co-pending U.S. Appl. No. 13/233,268 dated Dec. 13, 2011.
Office Action from co-pending U.S. Appl. No. 12/367,187 dated Jan. 6, 2012.
Office Action from co-pending U.S. Appl. No. 12/731,852 dated Dec. 22, 2011.
Business Dateline, Q Comm Expands Calling Card Products with Best Telecom Point-of-Sale Activated Cards; All Q Comm VeriFone Merchants Can Now Deliver Durable Calling Cards (Dec. 6, 2010), Business Wire (Dec. 8, 2011).
Notice of Allowance from co-pending U.S. Appl. No. 12/465,803 dated Dec. 20, 2011.
MasterCard Electronic prepaid (Oct. 2003). The Nilson Report, (798), (Dec. 9, 2011), The Banking Source (Document ID 474833171).
Office Action in co-pending U.S. Appl. No. 12/700,681 dated Mar. 23, 2012.
Jane Boon Pearlstine, "Lenders, Borrowers Hook Up Over the Web: Prosper.com and Other Sites Provide Forum for Individual Bidders Willing to Offer Small Loans", Wall Street Journal, May 20, 2006.
United Nations Conference on Trade and Development, "E-Finance and Small and Medium-Size Enterprises (SMEs) in Developing and Transition Economies", UNCTAD Expert Meeting, Oct. 17, 2001.
Tim Jones, "Paradigms Lost", RSA Journal, Oct. 2006, pp. 28-31.
Diego Rumiany, "Internet Bidding for Microcredit: Making it Work in the Developed World, Conceiving it for the Developing World", Mar. 2007.
Stefan Heng, Thomas Meyer,and Antje Stobbe, "Implications of Web 2.0 for Financial Institutions: Be a Driver, Not a Passenger", Munich Personal RePEc Archive, Jul. 31, 2007.
Matt Flannery, "Kiva and the Birth of Person to Person Microfinance", Innovations, pp. 31-58, Winter & Spring 2007.
Michael K. Hulme and Collette Wright, "Internet Based Social Lending: Past, Present and Future", Social Futures Observatory, Oct. 2006.
Richard W. Coleman, "Is the Future of the Microfinance Movement to be Found on the Internet?", International Trade and Finance Association Working Papers, 2007.
Amanda Scott and Patrick Towell, "The Web We Weave", Financial World, pp. 12-15, Nov. 2006.
Prosper, "Access and Transparency through Person-to-Person Lending," FDIC Advisory Committee on Economic Inclusion, Mar. 28, 2007.
Co-pending U.S. Appl. No. 12/338,402, filed Dec. 18, 2008, titled "Transfer Account Systems, Computer Program Products, and Associated Computer-Implemented Methods".
Co-pending U.S. Appl. No. 12/338,440, filed Dec. 18, 2008, titled "Transfer Account Systems, Computer Program Products, and Associated Computer-Implemented Methods".
Co-pending U.S. Appl. No. 12/338,712, filed Dec. 18, 2008, titled "Computer-Implemented Methods, Program Product, and System to Enhance Banking Terms Over Time".
Co-pending U.S. Appl. No. 12/338,684, filed Dec. 18, 2008, titled "Transfer Account Systems, Computer Program Products, and Associated Methods".
Co-pending U.S. Appl. No. 12/338,497, filed Dec. 18, 2008, titled "Private Label Promotion Card System, Program Product, and Associated Computer-Implemented Methods".
Co-pending U.S. Appl. No. 12/338,540, filed Dec. 18, 2008, titled "Private Label Promotion Card System, Program Product, and Associated Computer-Implemented Methods".
Co-pending U.S. Appl. No. 12/338,584, filed Dec. 18, 2008, titled "Transfer Account Systems, Computer Program Products,and Methods to Prioritize Payments From Preselected Bank Accounts".
Co-pending U.S. Appl. No. 12/338,645, filed Dec. 18, 2008, titled "Transfer Account Systems, Computer Program Products, and Methods to Prioritize Payments From Preselected Bank Accounts".
Co-pending U.S. Appl. No. 12/554,659, filed Sep. 4, 2009, titled "System,Method, and Program Product for Foreign Currency Travel Account".
Co-pending U.S. Appl. No. 12/554,432, filed Sep. 4, 2009, titled "System, Program Product and Methods for Retail Activation and Reload Associated With Partial Authorization Transactions".
Cross, Sam Y., All About . . .The Foreign Exchange Market in the United States, 1998, Federal Reserve Bank of new York.
Wolfe, Daniel, "An E-Variation on Payday Loan Theme", American Banker, Jul. 28, 2005 (Cited in Notice of Allowance by Examiner).
Financial Advice Investment Money Oct. 1, 2009 at 5:50pm, HSBC Offshore Internet Banking (Cited in Notice of Allowance in co-pending U.S. Appl. No. 12/554,659 by Examiner).
Financial Advice Investment Money Oct. 1, 2009 at 7:52 am, HSBC Offshore Internet Banking (Cited in Notice of Allowance in co-pending U.S. Appl. No. 12/554,659 by Examiner).
Orszag, Peter, "Unemployment Insurance as an Economic Stimulus", Center for Budget and Policy Priorities, Nov. 15, 2011.
Powell, Robert L., "Statewide Electronic Commerce Program Status Report", State of North Carolina Office of the State Controller, Mar. 7, 2007.
Parrott, James, "Jittery Wall Street, Calm City?", Gotham Gazette, Apr. 16, 2007.
Zandi, Mark, "Washington Throws the Economy a Rope", Moody's Economy.com, Jan. 22, 2008.
Blair, Christine E., et al., "Challenges to the Dual Banking System: The Funding of Bank Supervision", FDIC Bank Review, Mar. 31, 2006.
"Developing Asia and the World", Asian Development Bank 2002.
Microtrax LTD., PC Electronic Payment Systems Reference Manual; 1995 (381 pages).
Caskey, John P. et al., "Is the Debit Card Revolution Finally Here", Federal Reserve Bank of Kansas City, Economic Review: Fourth Quarter 1994; pp. 70-95, vol. 79, #4 (17 pages).
Castaneda, Laura, "Business Promote Services to Customers Day In and Day Out", The Dallas Morning News, Nov. 26, 1994 (3 pages).
Mannix, Margaret, "Checkout Tech", U.S. News and World Report, Feb. 27, 1995, (6 pages).
"Credit Terminals to be Used at Canadian Liquor Outlets", Card News, Jan. 23, 1995, (1 page).
"Debit Card Popularity on the Rise," Chain Store Age Executive, Jan. 1994, (1 page).
"Debit Goes to Dinner", Credit Card Management, New York, Oct. 1994 (2 pages).
Peppard, Alan, "Down and Dirty in Deep Ellum," The Dallas Morning News, Dec. 3, 1994 (2 pages).
Everest Reference Manual, VeriFone Part No. 25399, Revision A, Manual Revision 1.0, Jul. 1995, (66 pages).
"Express Cards and Trains", Chain Store Age Executive Edition, Jan. 1995, (1 page).
Brown, Suzanne, "Goodnight Amy, Meg, Beth and Jo", Rocky Mountain News, Dec. 8, 1994 (1 page).
Klein, Robert J., "Here Comes the Debit Card", D& B Reports, Jul./Aug. 1990 (2 pages).
Hypercom S7C Advertisement, Chain Store Age, Sep. 1995 (4 pages).
Hypersom S7SC Advertisement, Chain Store Age, Feb. 1996 (2 pages).
IBM 4680-4690 Advanced Payment System for Chain Drug Sales Application User's Guide, Nov. 1996 (256 pages).
IBM 4680-4690 Advanced Payment System for Chain Drug Sales Application User's Guide, Jul. 1996 (248 pages).
IBM 4680-4690 Advanced Payment Systems for Supermarket Application User's Guide, Sep. 1996 (222 pages).
Fox, Linda A., "Keep an Eye on Your Credit Card," The Toronto Sun, Aug. 9, 1996 (1 page).

Pyatt, Rudolph A., Jr., "Mobil Stations to Permit Use of Bank Cards", The Washington Post (1 page).
NCR 4430-5000 MSR/PIN User's Guide, 1994 (265 pages).
Neiman Marcus: High-Tech for the Holidays, ADWEEK, Dec. 5, 1994 (1 page).
NM Offers Electronic Gift Certificate, Card Fax, Jan. 23, 1995 (1 page).
Neiman Marcus to Launch NM Express Automated Gift Card, PR Newswire, Nov. 22, 1994 (1 page).
NM Express Card Advertisement, The New Yorker, Dec. 12, 1994 (3 pages).
Service Mark Registration No. 1,981,044 for "NM Express Card", registered Jun. 18, 1996 (1 page).
Omni 480/490 Programmer's Guide, VeriFone Part No. 12924—Revision A, Manual Revision 1.0, Oct. 1993 (228 pages).
"One Company's Diversification Shakes Up Peripherals Market", Chain Store Age, Jun. 1996 (3 pages).
O'Keefe, Michael, "Portable POS Terminal Mean Greater Convenience", Bank Systems & Technology, Nov. 1994 (2 pages).
"POS Terminal Can Handle Direct Debits", ABA Banking Journal, Sep. 1984 (2 pages).
Racel Corp. Advertisement, POS Terminal Eliminates Credit Card Vouchers, ABA Banking Journal, Nov. 1985 (2 pages).
Szabo, Joan C., "The Changing World of Financial Services", Nation's Business, Oct. 1994 (7 pages).
VeriFone Everest Advertisement, Stores, May 1995 (2 pages).
VeriFone Folio (TM) Brings Credit and Debit Card Payment to the Restaurant Table, PR Newswire, May 16, 1994 (3 pages).
Barnes, David B., VeriFone Introduces Everest (TM) Customer Activated Payment System to Multi-Lane Retail Market, OR Newswire, Feb. 20, 1995 (2 pages).
VeriFone Introduces Pinpad (TM) 1000 to Point-of-Sale Debit Market, M2 Presswire, Apr. 21, 1995 (1 page).
VeriFone TCL Terminal Control Language Programmer's Manual, VeriFone Part No. 00368-01, Revision G, Manual Revision 8.0, Aug. 1992 (362 pages).
VeriFone Tranz 330 Reference Manual, VeriFone Part No. 00483-Revision D, Manual Revision 3.01, Apr. 1990 (144 pages).
Microtrax, LTD. Omni 490 M (and 490ML) Operation Manual for Integrated and Non-Integrated Configurations, 1994 (60 pages).
Microtrax Electronic Payment Systems: The MicroTrax Pinstripe Lane Equipment Users Guide, MicroTrax Ltd., Newport Beach, CA 1991 (54 pages).
IBM 4680-4690 Supermarket Application—Electronic Funds Transfer Feature Enhancement: User's Guide, IBM Corp., Research Triangle Park, NC, Sep. 1995 (318 pages).
IBM 4680 General Sales Application Electronic Funds Transfer User's Guide, IBM Corp., Research Triangle Park, NC, Dec. 1990 (280 pages).
IBM 4680 General Sales Application Electronic Funds Transfer User's Guide, IBM Corp., Research Triangle Park, NC, Mar. 1991 (263 pages).
IBM 4680 General Sales Application: Guide to Operations, Research Triangle Park,NC, Jun. 1991 (429 pages).
Krino, Gary, et al., "A Birthday Card That Pays Off", The Orange County Register, Jul. 19, 1996 (2 pages).
Cohen, Bruce, "Alternative to Cash Gains Ground", The Financial Post, Apr. 22, 1994 (2 pages).
Bank of Boulder POS Debit Card Solution at the Table Now in Beta: First Bank to Vertify IVI Spirit C2000 on MAPP (R), Business Wire, Aug. 3, 1994 (1 page).
Co-pending U.S. Appl. No. 12/562,331, filed Sep. 18, 2009, titled "Computerized Extension of Credit to Existing Demand Deposit Accounts, Prepaid Cards and Lines of Credit Based on Expected Tax Refund Proceeds, Associated Systems and Computer Program Products".
Co-pending U.S. Appl. No. 12/700,681, filed Feb. 4, 2010, titled System and Computer Program Product to Issue A Retail Prepaid Card including A User-Designed External Face Using a Chit And Related Computer Implemented Methods.
Co-pending U.S. Appl. No. 12/814,405, filed Jun. 11, 2010, titled Environmental-Friendly Fuel Credit Card System, Program Product, and Computer-Implemented Methods.
Co-pending U.S. Appl. No. 12/877,490, filed Sep. 8, 2010, titled "System, Program Product, and Method for Debit Card and Checking Account Autodraw".
Co-pending U.S. Appl. No. 12/877,524, filed Sep. 8, 2010, titled System, Program Product, and Method for Debit Card and Checking Account Autodraw.
Co-pending U.S. Appl. No. 12/889,281, filed Sep. 23, 2010, titled "Computer-Implemented Methods, Computer Program Products, and Systems for Enhanced Loan Product Repayments".
Co-pending U.S. Appl. No. 12/892,847, filed Sep. 28, 2010, titled "Computer-Implemented Methods, Computer Program Products, and Systems for Management and Control of a Loyalty Rewards Network".
Co-pending U.S. Appl. No. 12/731,852, filed Mar. 25, 2010, titled "Machine, Program Product, and Computer Implemented Methods for Confirming a Mobile Banking Request".
Co-pending U.S. Appl. No. 13/036,076, filed Feb. 28, 2011, titled "Machine, Program Product, and Computer-Implemented Method to Construct a Person-To-Person Loan".
Co-pending U.S. Appl. No. 12/417,199, filed Apr. 2, 2009, titled "System, Program Product, and Associated Methods to Autodraw for Micro-Credit Attached to a Prepaid Card".
Co-pending U.S. Appl. No. 12/389,749, filed Feb. 20, 2009, titled "Methods to Advance Loan Proceeds on Prepaid Cards, Associated Systems and Computer Program Products".
Co-pending U.S. Appl. No. 12/397,113, filed Mar. 3, 2009, titled "Person-To-Person Lending Program Product, System, and Associated Computer-Implemented Methods".
Co-pending U.S. Appl. No. 12/338,365, filed Dec. 18, 2008, titled "Transfer Account Systems, Computer Program Products, and Associated Computer-Implemented Methods".
"Letter of Credit Explained: What is Letter of Credit?", Dec. 26, 2005, pp. 1-2.
VIPGift Received Investment from Summit Partners and Bridgescale Partners, Nov. 11, 2008, Chattanooga, TN and Palo Alto, CA.
Bank Deals-Best Rates and Deals: EverBank's World Currency CDs—My Interview with EverBank's Executive Frank Trotter, http://bankdeals.blogspot.com, Jul. 29, 2007.
Foreign Exchange Market, http://en.wikipedia.org.
Avoid Gift Card Pitfalls, ConsumerReports.org.
Zubko, N., "An Automotic Connection Electronic Transaction Tools Help Manufacturers Connect With Suppliers to Streamline Sourcing Efforts", Industry Week, Jul. 2008, pp. 26-27, vol. 257, No. 7.
Lazarus, David, "120% rate for Wells' Advances", Oct. 16, 2004, San Francisco Chronicle (cited in Final Office Action in co-pending U.S. Appl. No. 12/338,684 dated Sep. 23, 2011.
Office action from co-pending U.S. Appl. No. 12/338,497 dated Aug. 18, 2011.
Notice of Allowance for co-pending U.S. Appl. No. 12/417,199 dated Aug. 18, 2011.
Notice of Allowance for co-pending U.S. Appl. No. 12/417,211 dated Aug. 22, 2011.
Notice of Allowance for co-pending U.S. Appl. No. 12/554,659 dated Aug. 2, 2011.
Office Action in co-pending U.S. Appl. No. 12/338,712 dated Jul. 28, 2011.
Office Action in co-pending U.S. Appl. No. 12/338,440 dated Aug. 1, 2011.
Office Action in co-pending U.S. Appl. No. 12/367,187 dated Jun. 27, 2011.
Office Action in co-pending U.S. Appl. No. 12/609,896 dated Apr. 5, 2011.
Office Action in co-pending U.S. Appl. No. 12/417,162 dated Apr. 13, 2011.
Office Action in co-pending U.S. Appl. No. 12/338,684 dated Mar. 4, 2011.
Office Action in co-pending U.S. Appl. No. 12/417,199 dated Mar. 17, 2011.
Office Action in co-pending U.S. Appl. No. 12/465,803 dated Mar. 17, 2011.
Office Action in co-pending U.S. Appl. No. 12/338,584 dated Mar. 22, 2011.

Office Action in co-pending U.S. Appl. No. 12/417,211 dated Mar. 29, 2011.
Office Action in co-pending U.S. Appl. No. 12/407,320 dated Mar. 29, 2011.
Office Action in co-pending U.S. Appl. No. 12/338,402 dated Feb. 18, 2011.
Office Action in co-pending U.S. Appl. No. 12/338,402 dated Sep. 28, 2010.
Office Action in co-pending U.S. Appl. No. 12/417,162 dated Sep. 3, 2010.
International Search Report for PCT/US09/56072 dated Oct. 20, 2009.
International Search Report for PCT/US09/39504 dated May 27, 2009.
International Search Report for PCT/US09/39512 dated Jun. 8, 2009.
International Search Report for PCT/US09/43978 dated Jun. 30, 2009.
International Search Report for PCT/US09/43988 dated Jul. 14, 2009.
International Search Report for PCT/US09/39492 dated May 14, 2009.
International Search Report for PCT/US09/39495 dated May 18, 2009.
International Search Report for PCT/US08/87689 dated Jun. 17, 2009.
Office Action in co-pending U.S. Appl. No. 12/338,365 dated Jul. 9, 2010.
Office Action in co-pending U.S. Appl. No. 12/338,645 dated Jul. 9, 2010.
Office Action in co-pending U.S. Appl. No. 12/338,365 dated Jan. 26, 2011.
Office Action in co-pending U.S. Appl. No. 12/417,162 dated Jan. 19, 2011.
Office Action in co-pending U.S. Appl. No. 12/389,749 dated Feb. 1, 2011.
Office Action in co-pending U.S. Appl. No. 12/338,540 dated Sep. 1, 2011.
International Search Report for PCT/US09/34692 dated Apr. 14, 2009.
Notice of Allowance from co-pending U.S. Appl. No. 12/609,896 dated Oct. 27, 2011.
Office Action from co-pending U.S. Appl. No. 12/465,277 dated Oct. 20, 2011.
Office Action from co-pending U.S. Appl. No. 12/562,331 dated Oct. 20, 2011.
Notice of Allowance from co-pending U.S. Appl. No. 12/407,320 dated Oct. 18, 2011.
Final Office Action in co-pending U.S. Appl. No. 12/338,584 dated Sep. 15, 2011.
Final Office Action in co-pending U.S. Appl. No. 12/338,684 dated Sep. 23, 2011.
Office Action in co-pending U.S. Appl. No. 12/397,113 dated Sep. 20, 2011.
Notice of Allowance in co-pending U.S. Appl. No. 12/338,645 dated Oct. 3, 2011.
Office Action in co-pending U.S. Appl. No. 12/417,182 dated Sep. 28, 2011.
Office Action in co-pending U.S. Appl. No. 12/465,306 dated Nov. 10, 2011.
Office Action in co-pending U.S. Appl. No. 12/626,349 dated Nov. 22, 2011.
Final Office Action in co-pending U.S. Appl. No. 12/338,440 dated Jan. 19, 2012.

* cited by examiner ized estimate of the tax refund available as the line of credit; and adjusting the line of credit based on the determined funding proceeds expected to be available as a refund to ultimately repay the line of credit.

COMPUTERIZED EXTENSION OF CREDIT TO EXISTING DEMAND DEPOSIT ACCOUNTS, PREPAID CARDS AND LINES OF CREDIT BASED ON EXPECTED TAX REFUND PROCEEDS, ASSOCIATED SYSTEMS AND COMPUTER PROGRAM PRODUCTS

RELATED APPLICATIONS

This application is a continuation of U.S. patent application Ser. No. 12/407,320, titled "Computerized Extension of Credit To Existing Demand Deposit Accounts, Prepaid Cards And Lines of Credit Based on Expected Tax Refund Proceeds, Associated Systems And Computer Program Products," filed on Mar. 19, 2009, which is incorporated herein by reference in its entirety.

BACKGROUND

1. Field of Invention

The present invention relates generally to the financial service and banking industries, and, more particularly, to systems, computer program products, and associated methods to utilize the expectation of tax refunds to extend credit to existing demand deposit accounts, prepaid cards and lines of credit associated therewith.

2. Background

Millions of prepaid cards are issued each year in the United States. Many of the customers of prepaid cards rely primarily on cash and a prepaid card account for their personal finances; these customers often do not have a traditional checking, savings, or other bank deposit account, and they consequently do not write or otherwise use bank checks.

Short-term financing is at present a $20 billion plus per year industry. Considerable portions of this lending take the form of lines of credit, the proceeds of which are made available to the customers through demand deposit accounts and prepaid cards. It is believed by industry experts that an appropriate manner of offering micro-lending is through a federal bank.

SUMMARY OF INVENTION

Applicants have recognized a need for enhanced lending options, bank products, demand deposit accounts, and prepaid card accounts. The present invention provides computer systems, computer program products and computer-implemented methods for underwriting and extending credit based on expected tax refund proceeds to demand deposit accounts, prepaid cards and lines of credit associated therewith of customers and providing enhanced lending options for both banks and their customers. In view of the foregoing, Applicants have recognized a need for enhanced lending options, bank products, demand deposit accounts and prepaid card products associated therewith.

For example, Applicants have recognized a growing demand and need within the banking industry to provide lines of credit to customers or consumers who generally have had limited financial resource alternatives in their times of greatest need. According to the present invention, computer systems, computer program products, and computer-implemented methods are provided for providing a line of credit or enhancing an existing line of credit. The line of credit might operate as a micro-lending open line of credit product provided by a bank. The line of credit adjustment features of the present invention are made available through communications media, such as through a computer network, a global communication network such as the Internet, or through a stand alone computer system available through a lending source. The present invention is also provided as a computer program product stored on a tangible computer readable memory or storage device.

The adjustment of an existing line of credit according to the present invention provides a meaningful enhancement to consumers by offering a service that is commonly used and important to consumers today, e.g., advance access to a future electronic deposit based on an authorized portion or percentage of an amount of funds owed to the customer as a tax refund, typically that from an income tax return filed on behalf of the customer through by an income tax return preparation service. Qualified borrowers with existing lines of credit available may have their line of credit enhanced or adjusted. The adjustment may be the customer having the line of credit increased, repayment terms extended or borrowing costs improved. In some cases, the borrower will make draws in approved increments, allowing the borrower to only utilize the amount of credit needed, rather than a loan where the full amount is borrowed in one transaction. Authorized funds can be made available immediately for use by the borrower.

Some of the beneficial features of this line of credit product and line of credit enhancement are providing various types of assistance to consumers with the management of their finances by providing a short-term borrowing alternative that is more cost effective than other expensive financial service products such as payday loans. The line of credit product, however, can still be controlled, monitored, and managed by the bank or financing institution. This embodiment of a line of credit product can be less costly than other alternatives. This is a significant benefit from the perspective of the consumer, regulators, and lending institutions.

The present invention thus provides fund distribution opportunities to banks and to bank customers. For example, underwriting criteria can be based upon the prepaid card (or other types of banking cards) transaction history and direct deposit history and is often a requirement for consumer qualification for a line of credit.

The present invention may take several forms, including a computer program product stored on a tangible computer memory media that is readable by a computer, for advancing credit proceeds to a prepaid card account, the computer program product comprising a set of instructions that, when executed by the computer, cause the computer to perform various operations. The operations include forming a computerized estimate of a tax refund available from a tax return of the customer, information that would eventually be used on a future tax return or based on data from other sources (for example a credit bureau); determining in the computer a portion of the computerized estimate of the tax refund available as the line of credit; and adjusting in the computer the line of credit based on the determined funding proceeds expected to be available as a refund to ultimately repay the line of credit.

The present invention may also take the form of, a computer implemented method of adjusting a line of credit available to customer having a demand deposit account or prepaid card. According to the computer-implemented method, a computerized estimate of a tax refund is formed based upon information from a tax return, information that would eventually be used on a future tax return or from other sources (for example a credit bureau); a portion of the computerized estimate of the tax refund available as proceeds for funding the line of credit is determined in the computer; and the line of credit based on the determined funding proceeds available for the line of credit is adjusted.

The present invention may also take the form of issuing the consumer a new prepaid card, demand deposit account or credit card with a line of credit attached. The size of the line of credit is set based on underwriting criteria, which include the expected tax refund of the consumer. Such credit can then be accessed by the customer in increments (e.g., $20 draws) so only amounts that the customer needs to use are accessed, contrasted with a loan where all proceeds are loaned immediately to the borrower. By the system assessing a fee based on the amount drawn, the borrower only pays for what is used rather than the entire amount of credit offered or made available by the lender. In such fashion, the consumer is able to save money by not being forced to pay unnecessary fees by borrowing more than is needed.

The present invention may also take the form of a computer system for adjusting a line of credit available to customer having a demand deposit account. According to the computer-implemented method, a computerized estimate of a tax refund available from a tax return of the customer is formed in the computer system; a portion of the computerized estimate of the tax refund available as proceeds for funding the line of credit is determined in the computer system and the line of credit based on the determined funding proceeds available for the line of credit is adjusted in the computer.

BRIEF DESCRIPTION OF DRAWINGS

So that the manner in which the features and benefits of the invention, as well as others which will become apparent, may be understood in more detail, a more particular description of the invention briefly summarized above may be had by reference to the embodiments thereof which are illustrated in the appended drawings, which form a part of this specification. It is also to be noted, however, that the drawings illustrate only various embodiments of the invention and are therefore not to be considered limiting of the invention's scope as it may include other effective embodiments as well.

DETAILED DESCRIPTION OF INVENTION

The present invention will now be described more fully hereinafter with reference to the accompanying drawings, which illustrate embodiments of the invention. This invention may, however, be embodied in many different forms and should not be construed as limited to the illustrated embodiments set forth herein; rather, these embodiments are provided so that this disclosure will be thorough and complete, and will fully convey the scope of the invention to those skilled in the art. Like numbers refer to like elements throughout.

According to the present invention, tax refund proceeds are applied or otherwise made available to demand deposit accounts, prepaid cards and associated lines of credit of a customer based on tax refund amounts expected to be available. A computerized estimate of the tax refund available from a tax return of the customer is formed. A portion of the computerized estimate of the tax refund which can be available as underwriting criteria for the line of credit is then determined. The line of credit is then adjusted, based on the refund expected to be available, in the stored data reflecting the line of credit. One or more of several adjustments may then be made: the line of credit may be increased; the borrowing costs modified; or the terms of payment adjusted. The invention may be implemented as a computerized process, a computer system or a computer program product.

More specifically, tax refund proceeds for a customer or consumer are entered and stored in machine-readable media on a card or other data storage mechanism. The proceeds are thus made available in the form of demand deposit accounts, prepaid cards and associated lines of credit to a customer based on tax refund amounts expected to be available. A computerized estimate of the tax refund available from a tax return of the customer is formed and appropriate records made by a tax return preparer or service provider. A portion of the computerized estimate of the tax refund which can be available as underwriting criteria for the line of credit is then determined in a computer of a credit facility provider, such as a bank, savings institution or the like. The line of credit data stored in a card or other storage medium is then adjusted based on the refund expected to be available, or some other form of adjustment made in the customer's records.

Figure 1:
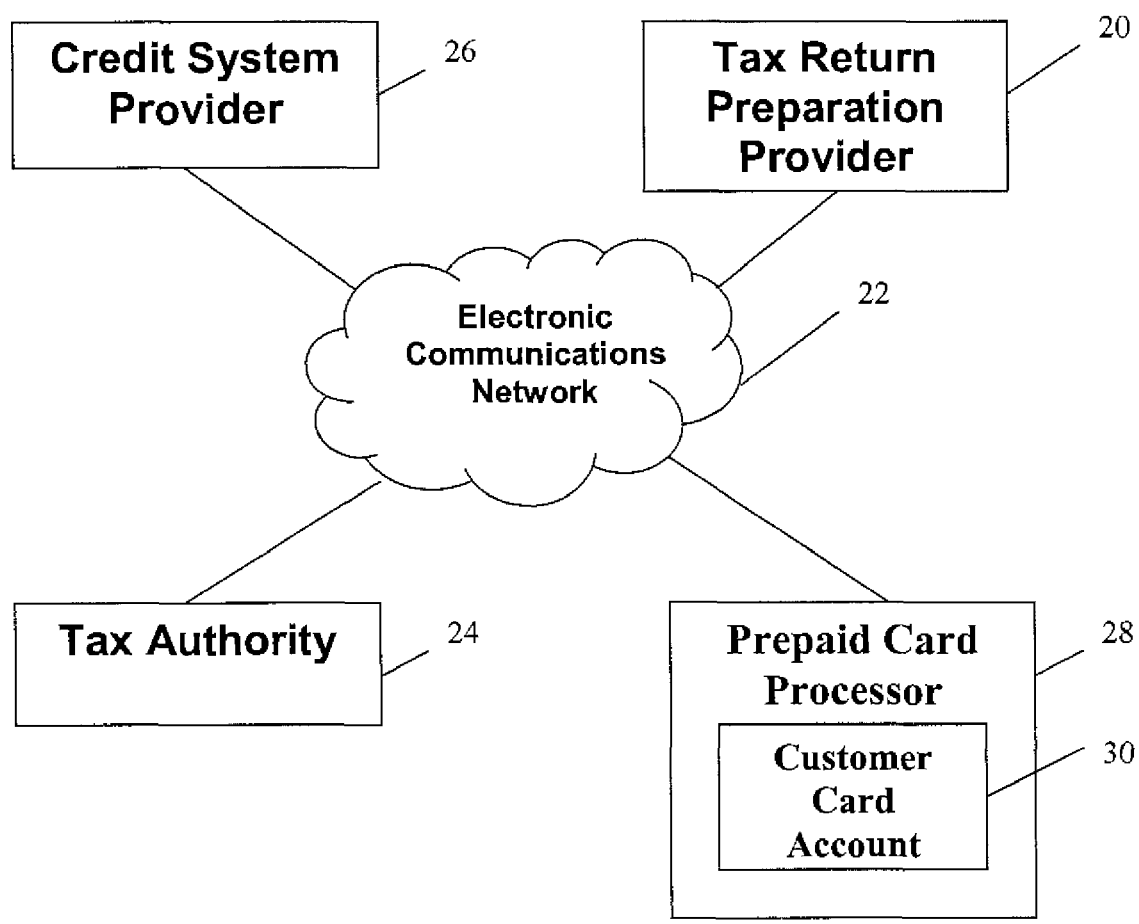
FIG. 1 is a schematic diagram of computers interconnected through an electronics communication network and involved in preparation and submission of tax refunds.

Referring to FIG. 1, a tax return preparer or service provider is shown schematically at 20 having a computer with data processing capability and appropriate links and interfaces for data communication and access through an electronic communications network 22, such as the Internet, to a computer system or data processor at a tax authority 24. The tax authority 24 typically is the United States Internal Revenue Service, although it should be understood that it may according to the present invention be some other tax authority or governmental entity. The tax return provider 20 may be, for example, one of the large entities such as Jackson Hewitt or H & R Block, or the like. The tax return preparation authority may also be some other entity such as an accounting firm, tax return preparer, accountant, individual or other authorized tax preparation service or group, as well.

According to the present invention, a credit provider 26 such as a bank or other institution having a computer or data processor with the capability of advancing credit by adjusting the data contents of the computer reflecting available funding to a customer, whether an individual or other entity. The credit advanced is in the form of a credit facility, such as a line of credit, loan, credit card or overdraft protection. The computer at the credit provider 26 interacts with the computers at the tax authority 24 and/or at the tax return preparation service 20 via suitable links and interfaces through the electronic communications network 24, as will be set forth. The credit provider 26 may be a bank or other lending institution, or it may be an underwriter operating in conjunction with a lending institution. The computer of credit provider 26 operates in a processing sequence which permits a customer or consumer to have access to funds or proceeds available through a demand deposit account or prepaid card processor or authority 28. The card processor 28 may take the form of an automated teller machine (ATM) or other telecommunications device or mechanism in electronic communication over the electronic communications network 22 with the computer of the credit system provider 26. The card processor 28 allows the consumer or customer to adjust the data contents of a credit card account 30. The credit card account 30 may take the form of a debit card, check card, bank card or other machine-readable medium or storage device which has appropriate data storage and memory functionality and capability reflecting the status of funds or proceeds to the customer, or consumer have authorized to use and access that particular card account 30 and make purchases or payments electronically.

The credit provider 26 provides access to the electronic records reflecting a credit facility which is formed according to the present invention based on a determination of expected tax refund proceeds to be eventually available to the consumer or customer based on appropriate adjustments made in the status of the customer card account after tax return processing by the tax authority 24. All, some or individual increments of such determined portions of expected tax return proceeds are applied or otherwise made available to demand deposit accounts, prepaid cards and associated lines of credit of the customer, as will be set forth.

The tax refund amounts expected may be calculated or determined in several ways according to the present invention. For example, the expected proceeds may be based on amounts indicated as a result of tax returns, typically income tax returns, prepared for the customer by the tax return preparer 20. The amounts may be those indicated available from tax-related information other than an actual tax return. For example, the tax-related information may be available as a result of calculations based on a tax payer's actual income or wage records, pay stubs or the like. Alternatively, as will be set forth, the amounts may be based on tax-related information may be available from a previous year's tax return, which might also be adjusted for verifiable changes in income or deductions status.

Figure 3:
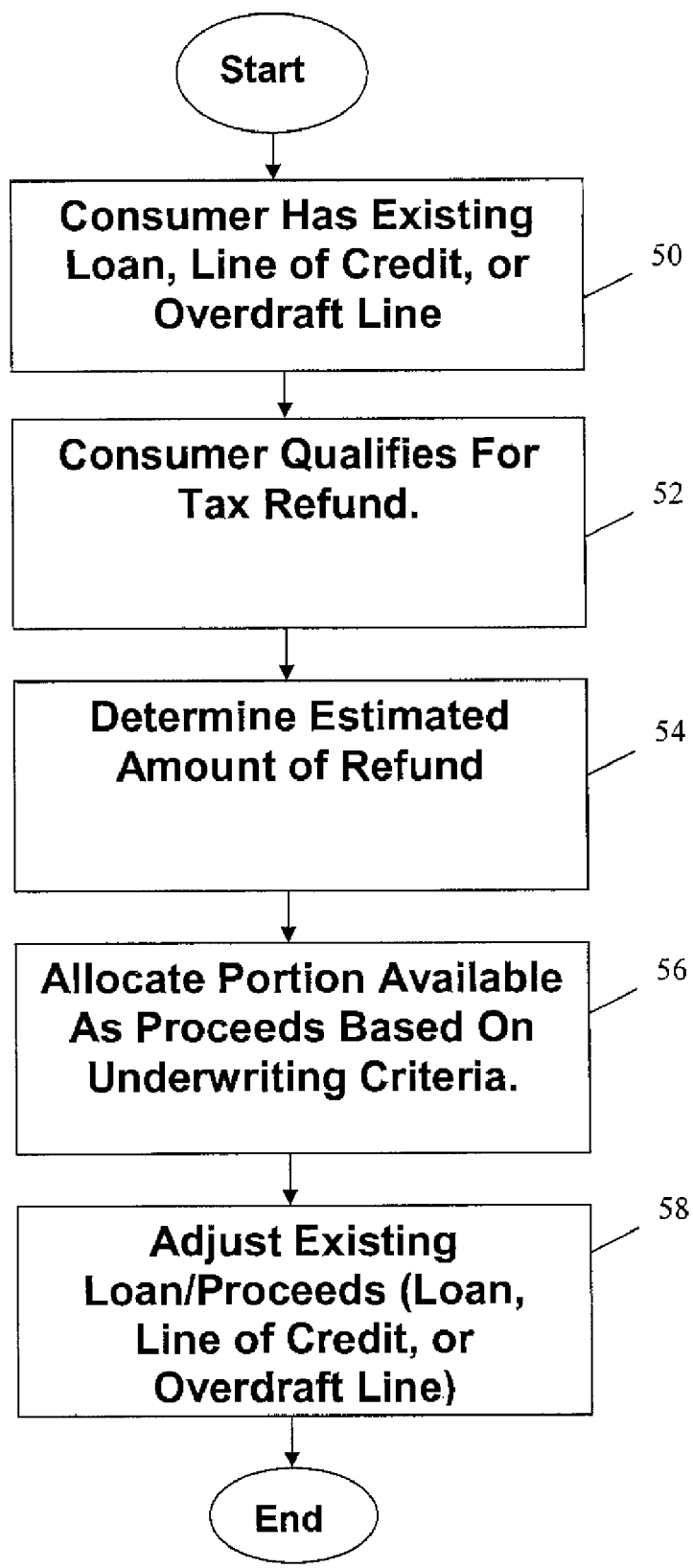
FIG. 3 is a schematic diagram of a computer-implemented sequence of steps performed in a computer according to the present invention.

Referring now to FIG. 3, a schematic diagram P of a computer-implemented process according to the present invention is set forth. As will be set forth, in the process P, a computer implemented method or process is performed in the computer of the credit system provider 26 to adjust a credit facility available to a customer having a demand deposit account or prepaid card. As indicated at step 50, an initial step is to verify in the electronic computer records of the credit provider 26 that the consumer has an existing loan, line of credit, overdraft line, credit card or other credit facility. Next, as an indicated at step 52, it is determined from the contents of the records of computations in the computer at the tax preparer 20 and the computer records of the tax authority 24 whether the consumer is indicated to either qualify or not qualify for a tax refund.

If it is indicated by the tax preparer 20 and tax authority 24 that a tax refund is in fact due to the customer as a result of step 52, and that the consumer is one who also has an existing credit facility as indicated during step 50, a determination is then made as indicated at step 54. During step 54, a determination is made of the amount of tax refund calculated to be owed the taxpayer consumer. The refund amount calculation may be performed using conventional computerized tax calculation methods, either by working with a tax preparation service, tax software provider, or comparable service as indicated at 24, or by direct filing by a consumer who otherwise demonstrates qualification for tax refund.

Thereafter, a portion of the computerized estimate of the expected tax refund is made available to the consumer as additional and/or modified terms on the line of credit is determined during step 56. The decision and amount are based on a set of underwriting criteria selected by the credit provider 26, typically also including a confirmation or other indication or verifiable expectation that the consumer is in fact to receive a tax refund. The expected tax refund information can be supplemented by other information, such as more traditional underwriting information available from a credit bureau or the like. Supplemental information of this or other types enables a lender to make a more comprehensive underwriting assessment. From the amount determined available during step 54, an amount of borrowing capacity is allocated in the computer during step 56 to be made available to the consumer's credit facility and the data contents stored and accessible in storage media of customer card account 30. Next, during step 58 the consumer's credit facility and the data contents stored and accessible in storage media of the customer card account are adjusted based on the expected refund proceeds that will be available to repay the line of credit as determined during step 56.

According to the present invention, the verifiable indication or expectation of tax refund is applied during step 58 as underwriting criteria to adjust a credit facility of the consumer, whether an existing loan, line of credit, overdraft line, credit card or the like stored and accessible in storage media of a customer card account. Supplemental information of the type described above may be used at this time. Adjustment of the credit facility may take several forms according to the present invention. The credit adjustment may be as credit attached to one or more of several consumer accounts, much as a demand deposit, prepaid card, direct deposition account, credit card, or the like. Other examples of adjustments include improving the terms of the credit, increasing the amount of credit available, reducing the fees associated with the credit, extending repayment terms to make repayment upon receipt of the tax refund rather than wages, or other known, conventional forms of credit adjustment.

The present invention also includes extending credit to a consumer on an ongoing basis based on the expectation of tax refunds. The existence of an expected refund in the spring (January through April) can allow an underwriter to extend credit to such consumer any time throughout the year, providing for repayment when a tax refund is received, possibly also including other repayment options. Such repayment can free up additional credit again, allowing the lender to provide year round access to such credit.

The present invention also includes computerized extension of credit in appropriate situations when a consumer has yet to timely file a tax return, but is able to provide satisfactory records to indicate a refund is likely. Such evidence could include, for example, records of past refunds, pay stub information, pay records withholding tax records and the like.

The present invention may also be made available in situations where there are multiple adjustments to the same existing account or line of credit at different points in time. For example, there may be initial adjustments made to the existing line of credit based on expected tax refund as determined by tax-related information that has yet to be filed. Subsequently, there may be further adjusting of the existing line of credit based on an expected tax refund once the actual tax return is prepared, the tax refund calculated and the tax return filed with the tax authority.

As an illustrative example of the present invention, consider a consumer who has an existing line of credit that allows the borrowing of up to $500 in increments of $20, (with an authorized fee of $2.50 for each increment borrowed) that is to be repaid on the next demand deposit. In this example of the present invention, the consumer visits (or contacts via phone or web) an authorized tax preparation service, such as indicated at 20 (FIG. 1). Upon review of records of the customer/consumer it is determined that the customer is likely to qualify for a tax refund of $3,000 even though a tax return has not yet been prepared.

As a result, the existing line of credit is extended to allow the customer to borrow up to an additional $1,000, and pay an appropriate fee (for example $1.50 for each $20 borrowed). The consumer can then have the additional borrowed amount repaid only once a tax refund is received. The consumer is provided additional credit on an existing credit product, while providing modified terms. Such additional credit can be accessible via the same methods as the existing credit, so if the customer was accessing credit via an overdraft line on a checking account, the additional credit is made available to be accessed through the same checking account.

As another example, consider a consumer who has an existing line of credit that allows the borrowing of up to $500 in increments of $20, again for an example authorized fee of $2.50 per $20 borrowed, that is to be repaid on the next demand deposit. After the consumer has a tax return prepared and filed, it can be determined that a calculated tax refund on the return sent to the Internal Revenue Service or IRS is $3,000. There are conventional financial methods, known as Refund Anticipation Loans, which may be available to some consumers. However these involve taking out a new loan on new terms, which are typically expensive. As an alternative, the present invention enables the consumer to have access to an additional $3,000 of credit available through that consumer's existing credit facility. That amount may be borrowed in small, say $20 increments at an appropriate fee, for example of $1 for each $20 borrowed. Further, any borrowed amount is to be repaid upon receipt of tax refund from the IRS. In this way, the consumer enjoys an expansion of an existing credit facility, while only borrowing what is needed from the credit line and only paying for the amount actually borrowed.

As another alternative, a consumer who is not yet a customer, but demonstrates that a tax refund is likely, may be provided with a line of credit that is accessible through a demand deposit account, prepaid card or credit card. The line of credit can include terms that allow the customer to access credit and not repay such credit until a tax refund is received. The present invention makes the credit available in increments the consumer can choose, rather than as a loan. In such fashion, the consumer borrows only as much as is required and only pays fees on the amounts borrowed.

As has been discussed, the present invention also provides for additional credit which can be granted as either a modification to an existing credit line (such as having fees reduced, having line amount temporarily increased, or both); or as a supplement to an existing credit line; or as adjustment of fees due or repayment terms.

Figure 2:
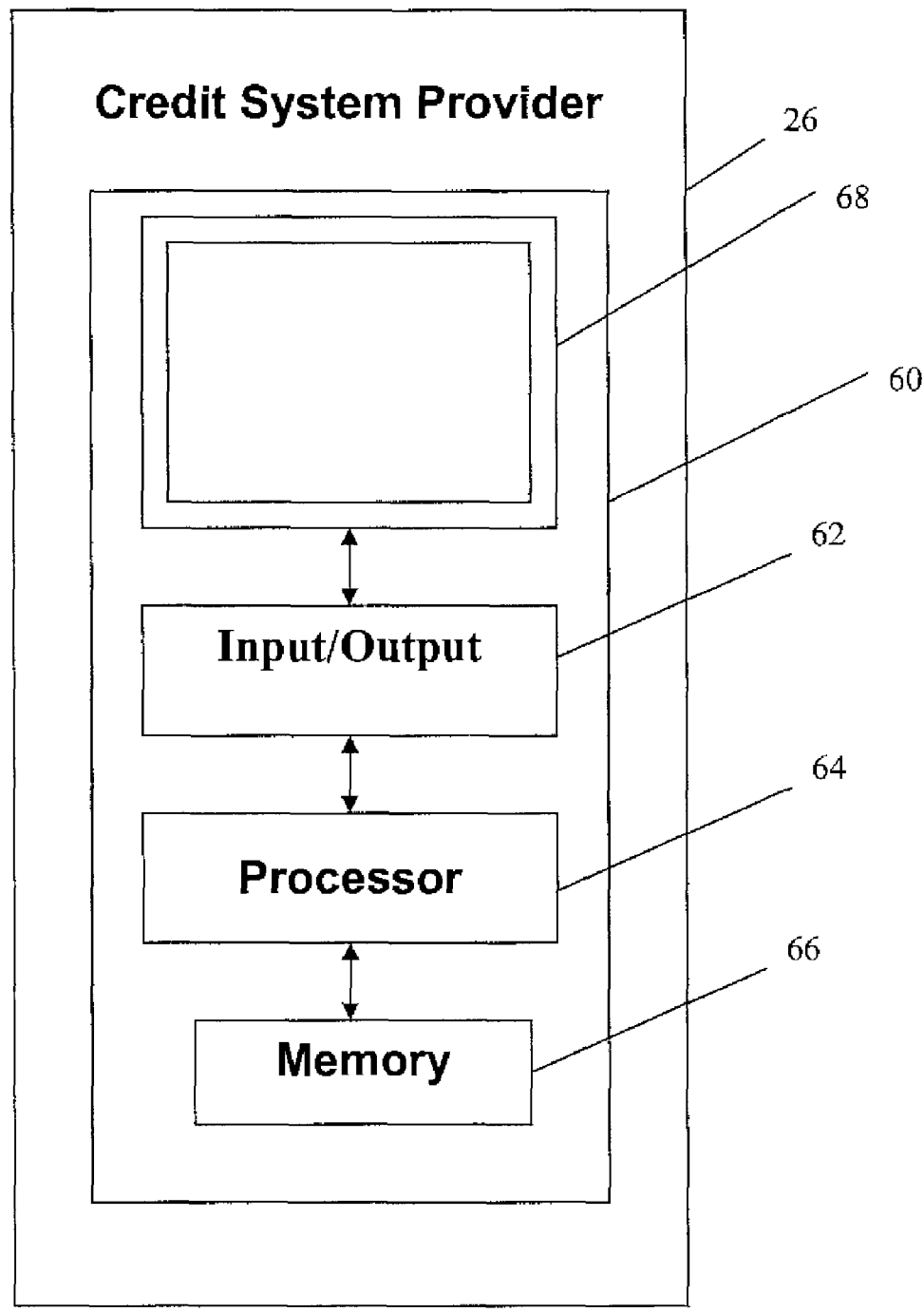
FIG. 2 is a schematic diagram of a computer system according to the present invention for adjusting a line of credit of a customer having a demand deposit account.

Referring to FIG. 2, a computer system or data processing machine 60 according to the present invention is illustrated schematically. The computer or computer system 60 adjusts the credit facility, whether line of credit, loan, overdraft line or the like, available to a customer having a demand deposit account or prepaid card 28, through customer card account 30 or otherwise accessible to the customer. The computer system 60 includes an input/output unit 62 for transferring information or data, as well as commands to the computer 60 from an operator. The input/output unit also receives data and information furnished the computer 60 from other authorized sources over the electronic communications network 22.

The computer system 60 also includes a processor 64 for responding to commands from an operator or generated internally within the processor and otherwise operating and controlling operation of the computer. The computer system 60 additionally includes a memory 66 conventional operating software and instructions for general purpose operation of the computer system 60 by the processor 64. According to the present invention, the memory 66 has stored therein a computer program product, stored on a tangible computer memory media, operable on the processor 64. The computer system 60 also includes, as is conventional, a display 68.

Figure 4:
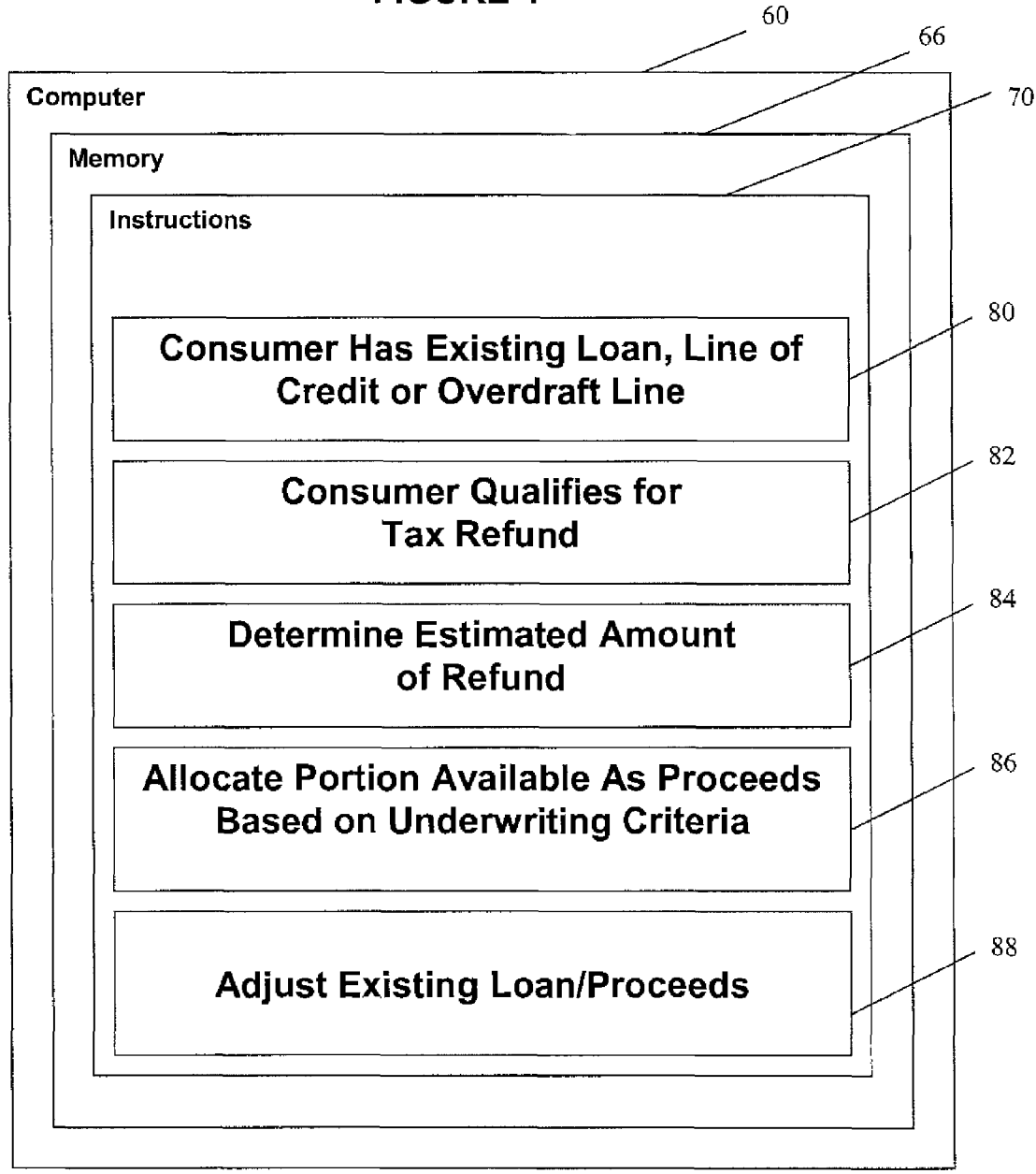
FIG. 4 is a schematic diagram of a computer program product stored in a computer readable medium according to the present invention.

The computer program product 70, as illustrated in FIG. 4, is typically associated with the computer system 60, stored on a tangible computer memory media 66, and operable by the processor 64 on the computer 60. The computer program product 70 takes the form of a set of instructions 80 that, when executed by the computer 60, cause the computer to perform various operations, including the processing sequence of the present invention as described above with regard to FIG. 3.

The computer program product illustrated in FIG. 4 is in the form of a set of instructions that, when executed by the processor 64, causes the computer 60 to adjust the credit facility available to the customer having the demand deposit account or prepaid card by performing the operations of the process of the present invention described above. The set of instructions according to the present invention, as stored in a suitable machine readable code in a tangible computer memory media, provides a computer program product 70 as shown schematically in FIG. 4.

As indicated in FIG. 4, the computer program product 70 includes code indicated schematically at 80 for determining if the consumer has an existing credit facility, such as a loan, line of credit, credit card or overdraft line. The computer program product 70 further includes code indicated schematically at 82 for a determination or confirmation that the consumer qualifies for a tax refund, as well as code indicated at 84 for calculation or determination of the estimated amount of tax refund available. The computer program product 70 also includes code indicated schematically at 86 for allocation of a determined portion available as proceeds based on underwriting criteria, as described above. The computer program product 70 further includes code indicated schematically at 88 for adjusting in the computer data base or memory and other financial records and documents the existing credit facility in the agreed one or more types of adjustments described above.

The tax preparation provider 20 and credit facility 26 are described and illustrated in FIG. 1 as distinct and separate facilities or entities. Further these facilities or entities may be located at the same or a different physical location. It should be understood, however, that the tax preparation provider 20 and credit facility 26 may be the same entity or related entities and that the computer system 60 may be programmed to include either or both of the tax return preparation/processing capabilities of the tax return provider 20 and the credit adjustment authorization capabilities of the credit institution 26. Thus, either or both of tax preparation and credit granting/underwriting services may be performed "in-house" at a single location or institution according to the present invention.

It should be understood that various types of computer readable media are available and adapted for storage of the computer program product 70 according to the present invention. Such forms of computer readable media include but are not limited to tangible storage media, such as nonvolatile, hard-coded type media such as read only memories (ROMs), CD-ROMs, and DVD-ROMs, or erasable, electrically programmable read only memories (EEPROMs), recordable type media such as floppy disks, hard disk drives, CD-R/RWs, DVD-RAMs, DVD-R/RWs, DVD+R/RWs, flash drives, memory sticks, and other newer types of memories; as well as transmission type media such as digital and analog communication links. For example, such media can include operating instructions, as well as instructions related to the system and the method steps described above and can operate on a computer. It should also be understood that such media can be at other locations instead of or in addition to the locations described above to store program products, e.g., including software, thereon.

Many modifications and other embodiments of the invention will come to the mind of one skilled in the art having the benefit of the teachings presented in the foregoing descriptions and the associated drawings. Therefore, it is to be understood that the invention is not to be limited to the illustrated embodiments disclosed, and that modifications and other embodiments are intended to be included within the scope of the appended claims.

That claimed is:

1. A computer-implemented method of adjusting an existing line of credit account, the method comprising of:
   determining, by a computer associated with a credit provider and configured to control a plurality of existing line of credit accounts, whether a consumer has one or more of the plurality of existing line of credit accounts, each of the plurality of existing line of credit accounts adapted to be drawn in at least one of a plurality of separate predetermined loan increments, each of the plurality of separate predetermined loan increments being equal in value;
   determining, by the computer, an estimated tax refund for the consumer responsive to the consumer having one or more of the plurality of existing line of credit accounts; and
   increasing, by the computer, a total credit limit of the one or more of the plurality of existing line of credit accounts by a number of separate predetermined loan increments based on the estimated tax refund to thereby increase existing available credit for the consumer, the increased available credit adapted to be drawn in at least one of the plurality of separate predetermined loan increments.

2. A computer-implemented method as defined in claim 1, wherein the one or more of the plurality of existing line of credit accounts are associated with one or more of a plurality of demand deposit accounts associated with the consumer; and the method further comprising the step of:
   loading, by the computer, one or more of the plurality of demand deposit accounts with, draws from the one or more of the plurality of existing line of credit accounts in at least one of the plurality of separate predetermined loan increments, a total value of a predetermined loan advance fee being equal to a predetermined fee multiplied by the number of separate predetermined loan increments loaded to the one or more of the plurality of demand deposit accounts.

3. A computer-implemented method as defined in claim 1, wherein the one or more of the plurality of existing line of credit accounts are associated with one or more of a plurality of prepaid card accounts associated with the consumer; and the method further comprising the step of:
   loading, by the computer, one or more of the plurality of prepaid card accounts with draws from the one or more of the plurality of existing line of credit accounts in at least one of the plurality of separate predetermined loan increments, a total value of a predetermined loan advance fee being equal to a predetermined fee multiplied by the number of separate predetermined loan increments loaded to the one or more of the plurality of prepaid card accounts.

4. A computer-implemented method as defined in claim 1, wherein the one or more of the plurality of existing line of credit accounts are associated with one or more of a plurality of customer accounts positioned remote from the computer and the method further comprising the step of:
   repaying at least a portion of a line of credit balance of one or more of the plurality of existing line of credit accounts responsive to receiving a tax refund associated with the consumer.

5. A computer-implemented method as defined in claim 1, wherein at least a portion of a line of credit balance of one or more of the plurality of existing line of credit accounts is not due until a tax refund associated with the consumer is received; and wherein the total credit limit is increased prior to a tax return being filed.

6. A computer-implemented method as defined in claim 1, wherein the estimated tax refund is based on an actual tax-filing.

7. A computer-implemented method as defined in claim 1, wherein the method further comprises:
   increasing, by the computer, the total credit limit of the one or more of the plurality of existing line of credit accounts by a second number of separate predetermined loan increments responsive a filing of an actual tax refund to thereby increase existing available credit for the consumer by a second amount, the second increased available credit adapted to be drawn in at least one of the plurality of separate predetermined loan increments.

8. A computer-implemented method as defined in claim 1, wherein the method further comprising the step of:
   adjusting one or more terms of the one or more of the plurality of existing line of credit accounts responsive to the estimated tax refund.

9. A computer-implemented method as defined in claim 1, the method further comprising:
   allocating a portion of the estimated tax refund to repay at least a portion of a line of credit balance of one or more of the plurality of existing line of credit accounts.

* * * * *